J. ROGERS.
SAW SET.
APPLICATION FILED SEPT. 22, 1909.

971,079.

Patented Sept. 27, 1910.

Witnesses
Oliver W. Holmes
R. Albright

Inventor
Jesse Rogers,
By O'Meara & Brock
Attorneys

UNITED STATES PATENT OFFICE.

JESSE ROGERS, OF PROVINCETOWN, MASSACHUSETTS.

SAW-SET.

971,079.

Specification of Letters Patent. Patented Sept. 27, 1910.

Application filed September 22, 1909. Serial No. 518,997.

*To all whom it may concern:*

Be it known that I, JESSE ROGERS, a citizen of the United States, residing at Provincetown, in the county of Barnstable and State of Massachusetts, have invented a new and useful Improvements in Saw - Sets, of which the following is a specification.

This invention relates to saw sets and more particularly to automatic saw sets, the object being to provide a saw set with a spring actuated hammer which is adapted to be released automatically after the same has been adjusted in position on the saw so that the same will strike the tooth a blow to set the same.

Another object of my invention is to provide a saw set which is exceedingly simple and cheap in construction and one which can be readily handled and easily and quickly placed in position on the saw so that the teeth can be readily set by simply operating a lever.

A further object of my invention is to provide means for adjusting the blow of the hammer against the tooth of the saw so as to increase or decrease the set of the same.

A still further object of my invention is to provide the tool with an adjustable anvil which can be readily adjusted to suit the tooth of different makes of saws.

Still another object of my invention is to provide a saw set which is so constructed that the hammer will be brought back against the tension of the spring and automatically released so that the die carried thereby will be brought into engagement with the tooth of the saw in such a manner that the tooth will be bent over.

Another object of my invention is to provide a tool having a pivoted sear member mounted thereon, which is adapted to co-act with the hammer when the lever is operated so that the hammer will be thrown backwardly by the continued pressure of the lever and the sear will be thrown out of engagement with the hammer by a screw coming into engagement with the lever, so as to release the same.

Figure 1:
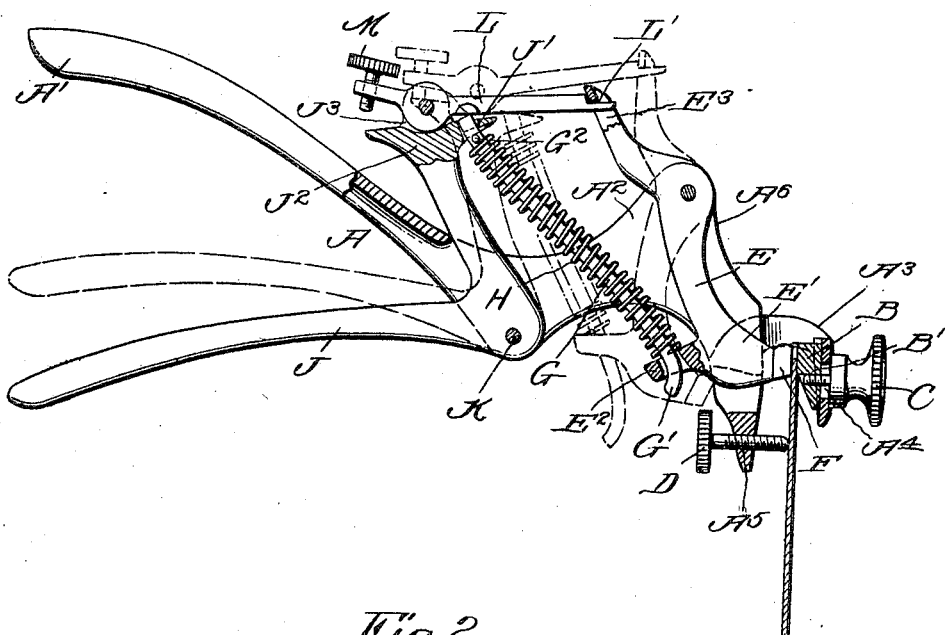
Figure 2:
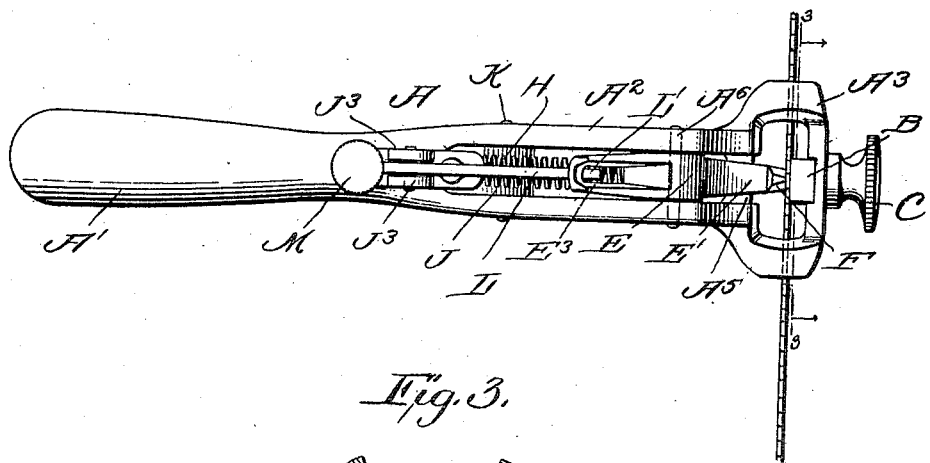
Figure 3:
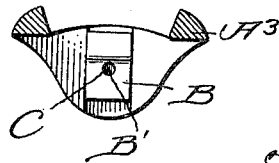

With these various objects in view, my invention consists in the novel features of construction, combination and arrangement of parts hereinafter fully described, pointed out in the claims and shown in the accompanying drawings, in which, Figure 1 is a vertical section partly in elevation through my improved tool showing the same arranged on a saw. Fig. 2 is a top plan view of my improved tool showing the same arranged upon the saw. Fig. 3 is a section taken on line 3—3 of Fig. 2.

In carrying out my improved invention I employ a handle frame A which is provided with a handle A', a bifurcated portion $A^2$ and a head portion $A^3$, which is substantially inverted U-shaped and is adapted to receive the saw as will be hereinafter fully described.

The outer leg of the U-shaped portion $A^3$ is slotted as shown at $A^4$ and the inner face of the same is grooved in which is slidably mounted an anvil B which is locked in its adjusted position by a thumb-screw C which extends through the slot $A^4$ and works into a threaded bore B' formed in the anvil B so that the same can be adjusted vertically. The other leg of the U-shaped portion $A^3$ is longer than the leg carrying the anvil and is provided with a threaded bore $A^5$ in which is mounted a thumb-screw D adapted to engage the saw when arranged therein for throwing the same at the proper angle so that the set of the teeth can be regulated.

Pivotally mounted in the upwardly projecting portions $A^6$ of the bifurcated portion $A^2$ is a hammer E provided with a head E' in which is secured a die F co-acting with the anvil B and the head portion E' is provided with an outwardly projecting slotted lug $E^2$ through which extends a curved end G' of a rod G which is surrounded by a coil spring H and is provided with a transverse pin $G^2$ against which the upper end of the spring H bears, said rod extending through a slot J' formed in the head $J^2$ of an angle lever J which is mounted in the bifurcated portion $A^2$ on a pivot K.

It will be seen that when the lever J is drawn toward the handle A' the spring will be compressed on the rod between the head and lug as will be hereinafter fully described.

The upper end of the hammer E is slotted as shown at $E^3$ through which extends a sear member L which is pivotally mounted in apertured ears J³ formed on the head J² of the lever J and is provided with a reduced end portion L' adapted to engage the end of the hammer E so that when the handles are drawn together the hammer will be swung on its pivot against the tension of the spring and the rod G sliding in the slot of the lug E² of the hammer and as the hammer is moved backwardly the sear member L is swung upwardly until the adjusting screw M mounted in the rear end of the sear member L is brought into engagement with the head J² of the lever which throws the reduced portion of the sear member out of engagement with the end of the hammer so that the hammer will be released and forced against the tooth of the saw by the action of the spring.

It will be seen that after the hammer has struck a blow, by releasing the lever J the same will be forced away from the handle A' so as to throw the sear member back into position to lock the hammer as the sear is drawn through the slot and the reduced portion will be thrown up into engagement or in other words the shoulder formed by the reduced portion will be thrown into engagement with the hammer by the action of the rod G which is free to move through the slot J' of the head of the lever so as to force the same upwardly and hold the members in position to be operated. By adjusting the set screw M the blow of the hammer can be regulated and it will be seen that when the screw is forced through the bore as far as possible the sear will be tripped so as to release the hammer after the same has been drawn rearwardly but a slight distance and by unscrewing the screw end the hammer will be drawn backwardly farther so as to strike a harder blow.

The operation is as follows: The anvil is adjusted to suit the saw to be set and by placing the U-shaped portion over the saw and screwing up on the thumb-screw D the angle of the set can be determined so that by operating the lever J the hammer will be drawn backwardly and as the lever J is moved toward the handle A' by the sear member L and the thumb-screw M is brought into engagement with the head of the lever the same will be tripped so as to release the hammer which will be forced into engagement with the tooth of the saw by the action of the spring so as to throw the same outwardly at an angle.

What I claim is:—

1. A saw set comprising a handle frame provided with a U-shaped head, an anvil carried by said head, a spring actuated hammer mounted in said frame co-acting with said anvil, said hammer being provided with a slotted upper end, a pivoted lever mounted in said frame, and a sear member carried by said lever extending through the slot of said hammer having a shoulder adapted to engage said hammer for operating the same.

2. A saw setting implement comprising a handle frame provided with a head, carrying an anvil, a spring actuated hammer mounted in said frame, a lever mounted in said frame, a sear member carried by said lever adapted to engage said hammer and adjustable means carried by said sear member for throwing the sear out of engagement with the hammer when brought into engagement with the lever.

3. A saw setting implement comprising a handle frame provided with a substantially inverted U-shaped head member, an anvil adjustably mounted in said head member, a screw carried by said head member, for engaging the saw when arranged therein, a hammer pivotally mounted in said frame provided with a die, said hammer being provided with a slotted portion, a lever pivotally mounted in said frame, a sear member carried by said lever working through the slot of said hammer provided with a shoulder for engaging said hammer and a rod working loosely through said hammer and lever surrounded by a spring for operating the hammer.

4. A saw setting implement comprising a handle frame provided with a saw receiving head, an anvil adjustably mounted within said head, a screw for engaging the saw within the head, a hammer pivotally mounted in said frame provided with a slotted upper portion and a slotted lug, a lever pivotally mounted in said frame provided with a head having a slotted portion, a rod arranged within the slotted portion of the head, extending through the slotted lug of the hammer, a spring surrounding said rod between said lug and head, a sear pivotally mounted on the head of the lever working through the slot of the hammer and provided with a shoulder for engaging the same and a set screw carried by said sear member for engaging the head of the lever for throwing the shoulder of the sear out of engagement with the hammer.

5. A saw setting implement comprising a handle frame provided with a head for receiving the saw, a hammer mounted in said frame for engaging the tooth of the saw, a spring for forcing said hammer into engagement with the saw, a pivoted lever, and a sear member carried by said lever for moving said hammer against the tension of the spring and releasing the same automatically said sear member having adjustable means for releasing the hammer.

6. A saw setting implement comprising a handle frame provided with a head, an anvil adjustably mounted within the head, a spring actuated hammer in said frame co-acting with the anvil, said hammer being provided with a slotted portion, a pivoted lever mounted in the frame provided with a head, a sear member mounted in said head working through the slot of the hammer and provided with a shoulder for engaging the same and a thumb-screw carried by said sear for engaging the head of the lever for throwing the shoulder out of engagement with the hammer.

JESSE ROGERS.

Witnesses:
W. H. YOUNG,
M. C. YOUNG.